United States Patent
Friel et al.

(10) Patent No.: US 10,439,947 B2
(45) Date of Patent: Oct. 8, 2019

(54) METHOD AND APPARATUS FOR PROVIDING DEADLINE-BASED SEGMENTATION FOR VIDEO TRAFFIC

(71) Applicant: CISCO TECHNOLOGY, INC., San Jose, CA (US)

(72) Inventors: Joseph Friel, Ardmore, PA (US); Hugo Latapie, Long Beach, CA (US); Andre Surcouf, Saint leu la Foret (FR); Enzo Fenoglio, Issy-les-Moulineaux (FR); Thierry Gruszka, Le Raincy (FR)

(73) Assignee: Cisco Technology, Inc., San Jose, CA (US)

( * ) Notice: Subject to any disclaimer, the term of this patent is extended or adjusted under 35 U.S.C. 154(b) by 176 days.

(21) Appl. No.: 15/354,759

(22) Filed: Nov. 17, 2016

(65) Prior Publication Data

US 2018/0139146 A1 May 17, 2018

(51) Int. Cl.
| | |
|---|---|
| *H04L 12/835* | (2013.01) |
| *H04L 12/861* | (2013.01) |
| *H04L 12/875* | (2013.01) |
| *H04N 21/442* | (2011.01) |
| *H04N 21/658* | (2011.01) |
| *H04N 21/845* | (2011.01) |

(52) U.S. Cl.
CPC .......... *H04L 47/30* (2013.01); *H04L 49/9036* (2013.01); *H04L 47/564* (2013.01); *H04N 21/44209* (2013.01); *H04N 21/6581* (2013.01); *H04N 21/8456* (2013.01)

(58) Field of Classification Search
None
See application file for complete search history.

(56) References Cited

U.S. PATENT DOCUMENTS

| 6,130,880 | A | * | 10/2000 | Naudus | ................... H04L 29/06 |
| | | | | | 370/235 |
| 8,141,120 | B2 | | 3/2012 | Zhang et al. | |
| 8,752,100 | B2 | | 6/2014 | Ramakrishnan et al. | |
| 8,767,553 | B2 | | 7/2014 | Kokku et al. | |
| 2008/0273533 | A1 | * | 11/2008 | Deshpande | ........... H04L 47/564 |
| | | | | | 370/392 |
| 2010/0146569 | A1 | * | 6/2010 | Janardhan | .......... H04N 7/17318 |
| | | | | | 725/98 |
| 2012/0143986 | A1 | * | 6/2012 | Robinson | ................ H04L 67/06 |
| | | | | | 709/217 |

(Continued)

*Primary Examiner* — Ayaz R Sheikh
*Assistant Examiner* — Faiyazkhan Ghafoerkhan
(74) *Attorney, Agent, or Firm* — Cindy Kaplan

(57) ABSTRACT

According to one aspect, a method includes identifying at least a first chunk to be obtained, the at least first chunk including at least a first packet, and determining a deadline for the first chunk, the deadline being indicative of an amount of time before the first chunk is needed. The method also includes determining whether the deadline for the first chunk is relatively long, and de-prioritizing the first chunk with respect to obtaining the first chunk for queueing in a buffer when it is determined that the deadline for the first chunk is relatively long. Finally, the method includes obtaining the first chunk for queueing in the buffer, wherein obtaining the first chunk for queueing in the buffer includes obtaining the first chunk after obtaining a second chunk for queueing in the buffer, the second chunk having a shorter deadline than the deadline for the first chunk.

5 Claims, 8 Drawing Sheets

(56) References Cited

U.S. PATENT DOCUMENTS

| | | | |
|---|---|---|---|
| 2014/0052846 A1* | 2/2014 | Scherkus | H04N 21/44209 709/224 |
| 2014/0082146 A1* | 3/2014 | Bao | H04L 65/605 709/219 |
| 2014/0126502 A1* | 5/2014 | Westberg | H04W 72/1247 370/329 |
| 2014/0173676 A1* | 6/2014 | MacInnis | H04N 21/23406 725/116 |
| 2014/0245364 A1* | 8/2014 | Ramakrishnan | H04N 7/17318 725/97 |
| 2015/0103846 A1* | 4/2015 | Dung Dao | H04L 47/2416 370/437 |
| 2015/0172352 A1* | 6/2015 | Gopalakrishnan | H04L 65/608 709/219 |
| 2015/0215359 A1* | 7/2015 | Bao | H04L 65/605 709/219 |
| 2015/0250001 A1 | 9/2015 | Tan et al. | |
| 2015/0324230 A1* | 11/2015 | Xu | G06F 9/50 718/102 |
| 2015/0341281 A1* | 11/2015 | Welin | G10L 25/78 370/230 |
| 2016/0057064 A1* | 2/2016 | Appleby | H04L 47/25 709/219 |
| 2016/0094475 A1* | 3/2016 | Lynch | H04L 47/19 348/14.12 |
| 2016/0094614 A1* | 3/2016 | Ulupinar | H04L 65/4084 709/219 |
| 2016/0105903 A1* | 4/2016 | Hessler | H04W 72/1231 455/450 |
| 2016/0316388 A1* | 10/2016 | Rosen | H04W 28/0231 |
| 2016/0381177 A1* | 12/2016 | Minder | H04L 1/004 709/226 |

\* cited by examiner

METHOD AND APPARATUS FOR PROVIDING DEADLINE-BASED SEGMENTATION FOR VIDEO TRAFFIC

TECHNICAL FIELD

The disclosure relates generally to delivering content within networks. More particularly, the disclosure relates to using deadlines for video packets to adaptively and efficiently de-prioritize the video packets for delivery.

BACKGROUND

Video traffic uses substantial bandwidth on the Internet, and is generally considered to be a dominant type of traffic on the Internet. That is, video traffic is typically the main type of traffic on the Internet. Typically, a video stream is delivered using a file-based transport mechanism which does not allow for differentiated routing and queueing strategies for different parts of the video stream.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

In one embodiment, a method includes identifying at least a first chunk to be obtained, the at least first chunk including at least a first packet, and determining a deadline for the first chunk, the deadline being indicative of an amount of time before the first chunk is needed. The method also includes determining whether the deadline for the first chunk is relatively long, and de-prioritizing the first chunk with respect to obtaining the first chunk for queueing in a buffer when it is determined that the deadline for the first chunk is relatively long. Finally, the method includes obtaining the first chunk for queueing in the buffer, wherein obtaining the first chunk for queueing in the buffer includes obtaining the first chunk after obtaining a second chunk for queueing in the buffer, the second chunk having a shorter deadline than the deadline for the first chunk.

Description

Most traffic on the Internet is video traffic, as for example over-the-top (OTT) video traffic. In general, video is transmitted over a network or, more specifically, over the Internet in chunks, or groups of Internet Protocol (IP) packets. It should be appreciated that the size of chunks may vary widely. For example, a chunk may be sized to be associated with approximately five seconds of video content. Chunks associated with a video are typically uniquely or independently decodable and, thus, one chunk does not depend upon any other chunk to be played back correctly.

Chunks, or video packets which comprise the chunks, may have different latency requirements. While some chunks may effectively require low latency, as for example a latency of approximately one hundred milliseconds (ms) or less, other chunks may have a tolerance for a higher latency. That is, some chunks may have a relatively short deadline for delivery while other chunks may have a relatively long deadline for delivery.

As will be appreciated by those skilled in the art, when a consumer requests that a video be delivered, chunks may be requested as fast as possible until a suitable buffer, e.g., a buffer on a node or OTT client used by the consumer, is substantially filled. Once the buffer is substantially filled, the node operates in a steady state during which the node may periodically request chunks such that the buffer may remain substantially filled. In general, the majority of OTT adaptive bit rate (ABR) video packets may have a relatively long delivery deadline, as the packets are requested well in advance of when the packets are to be played back by a consumer.

By classifying packets or chunks according to their delivery deadlines, packets or chunks with a relatively long deadline may effectively be de-prioritized for delivery, while packets or chunks with a relatively short deadline may effectively be prioritized for delivery. As a result, network resources may be utilized in an efficient manner, and consumers of video delivered over a network may be provided with an enhanced viewing experience.

Figure 1A:
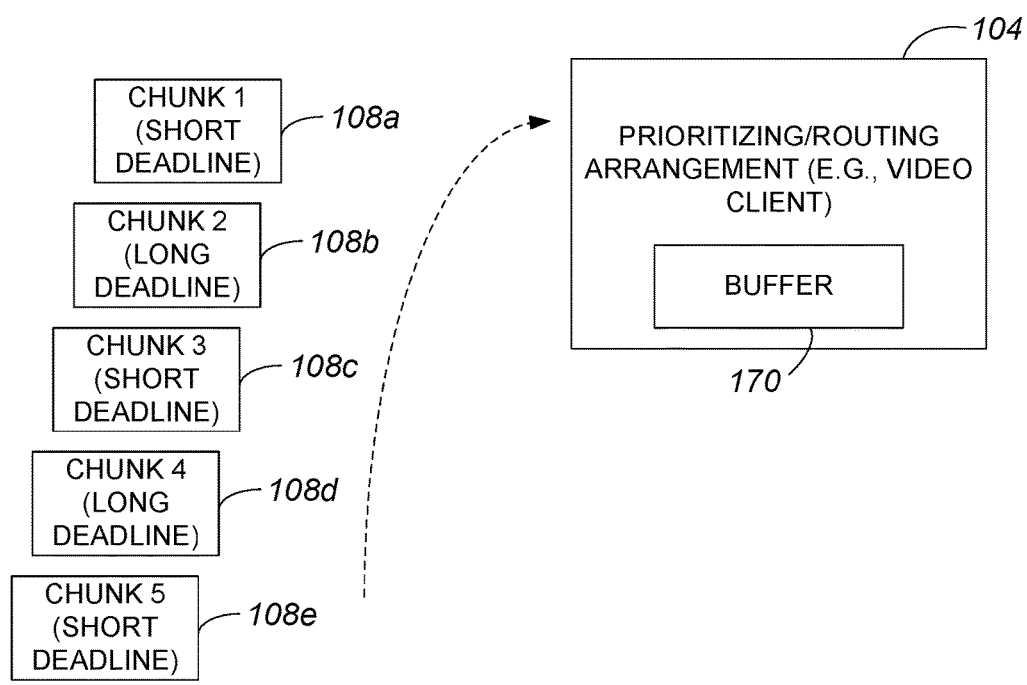
FIG. 1A is a diagrammatic representation of a stream of chunks, e.g., video chunks, at a time t1 before the stream of chunks is processed by a prioritizing/routing arrangement in accordance with an embodiment.
Figure 1B:
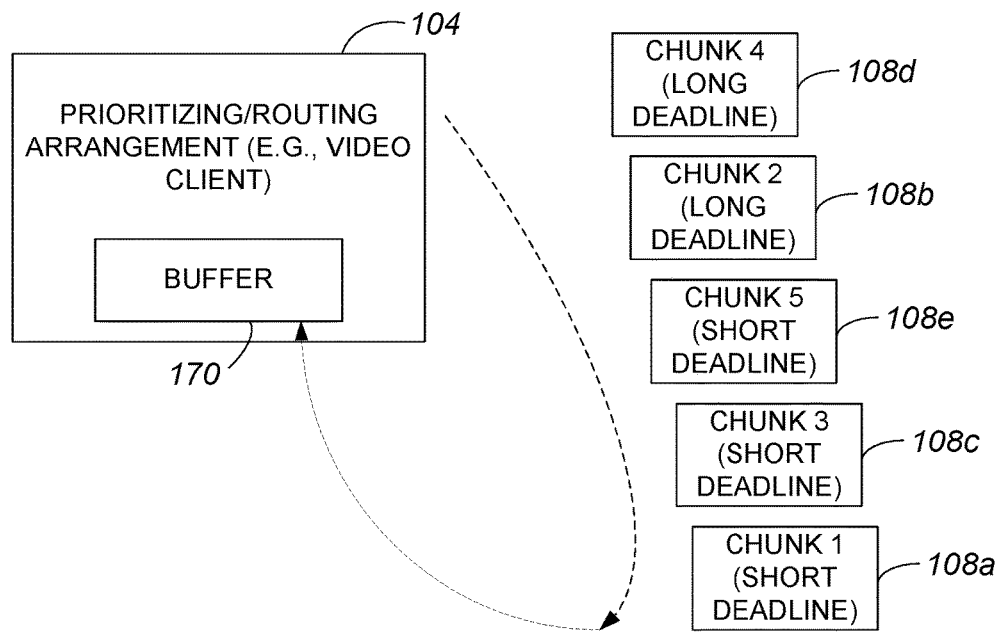
FIG. 1B is a diagrammatic representation of a stream of chunks at a time t2 after the stream of chunks is processed by a prioritizing/routing arrangement, i.e., prioritizing/routing arrangement 104 of FIG. 1A, in accordance with an embodiment.

Referring initially to FIGS. 1A and 1B, the use of deadlines in the forwarding and routing of video traffic will be described in accordance with an embodiment. FIG. 1A is a diagrammatic representation of a stream of chunks, e.g., video chunks, at a time t1 before the stream of chunks is processed by a prioritizing/routing arrangement in accordance with an embodiment. A prioritizing/routing arrangement 104 may be a client such as a video client which is arranged to obtain and to play back chunks.

When prioritizing/routing arrangement 104 obtains a request for video, e.g., internet video, the prioritizing/routing arrangement 104 may identify a stream of chunks 108a-e which is to be processed. That is, prioritizing/routing arrangement 104 identifies chunks 108*a-e* associated with a requested video that are to be queued in a buffer 170. Each chunk 108*a-e* has an associated delivery deadline. The delivery deadline of a chunk 108*a-e* may be substantially specified as a time by which chunk 108*a-e* is to be delivered to a requestor, or the delivery deadline of a chunk 108*a-e* may be substantially specified as an amount of time during which chunk 108*a-e* is to be delivered to a requestor.

In the described embodiment, once prioritizing/routing arrangement 104 identifies chunks 108*a-e*, prioritizing/routing arrangement 104 may effectively determine the actual deadlines associated with each chunk 108*a-e*. FIG. 1B is a diagrammatic representation stream of chunks 108*a-e* at a time t2 after chunks 108*a-e* are processed by prioritizing/routing arrangement 104 in accordance with an embodiment. After prioritizing/routing arrangement 104 identifies the deadlines associated with each chunk 108*a-e*, prioritizing/routing arrangement 104 may effectively determine an order in which chunks 108*a-e* may be obtained, e.g., placed into buffer 170. As shown, chunks 108*a*, 108*c*, and 108*e* have relatively short deadlines and are, therefore, obtained and placed in buffer 170 before chunks 108*b*, 108*d* which have relatively long deadlines.

In general, once deadlines of chunks are identified, the priority of the chunks may be identified. Chunks with relatively long deadlines are effectively de-prioritized, while chunks with relatively short deadlines may effectively be prioritized. Thus, chunks with relatively long deadlines may be obtained for placement in a buffer after chunks with relatively short deadlines are obtained. It should be appreciated that a threshold deadline may be identified to be used to determine whether a deadline may be classified as relatively long or relatively short. In other words, a deadline which is longer than a threshold deadline may be classified as relatively long, while a deadline which is shorter than the threshold deadline may be classified as relatively short.

Figure 2:
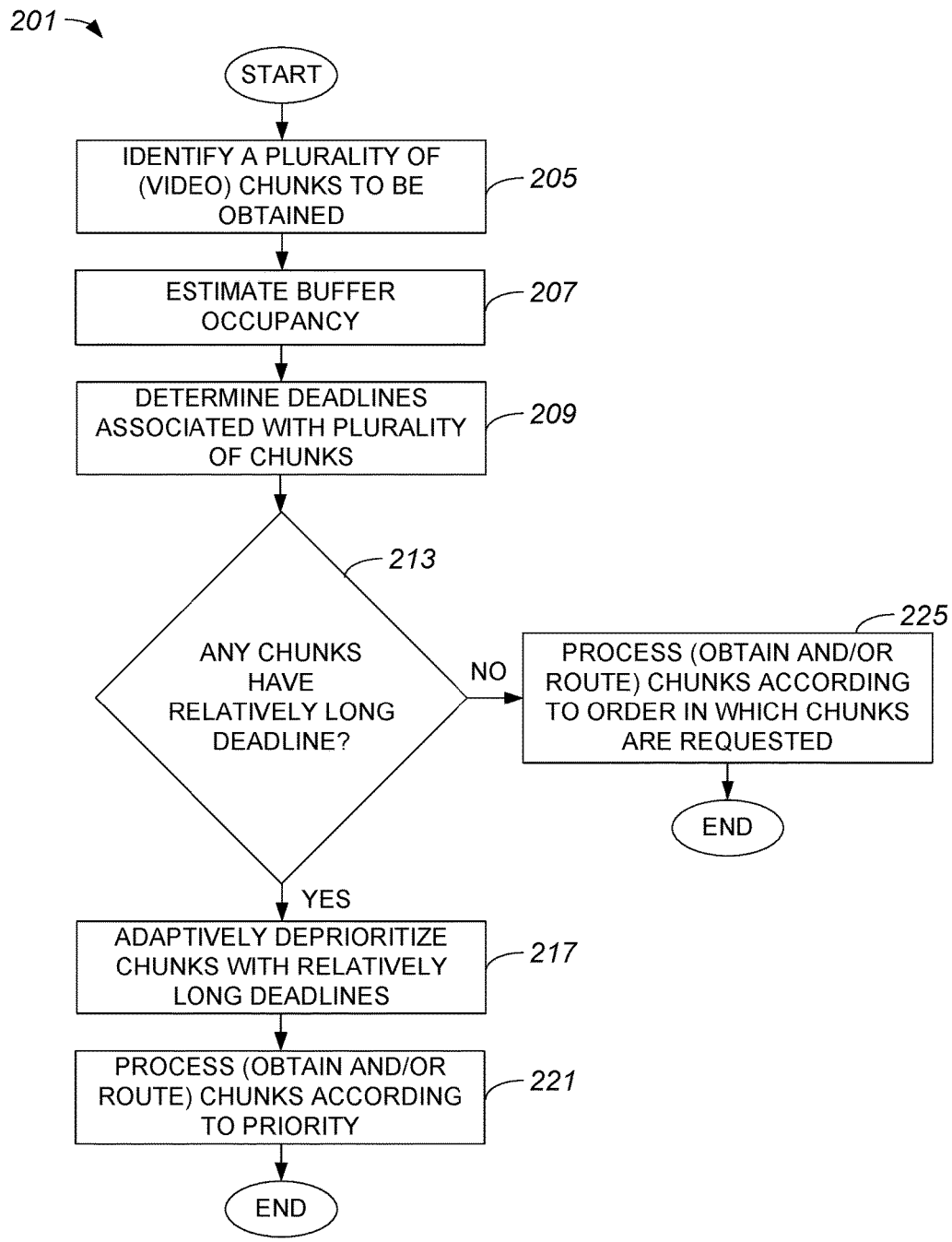
FIG. 2 is a process flow diagram which illustrates a method of delivering chunks that includes de-prioritizing the chunks based on delivery deadlines of the chunks in accordance with an embodiment.

FIG. 2 is a process flow diagram which illustrates a method of delivering chunks that includes de-prioritizing the chunks based on delivery deadlines of the chunks in accordance with an embodiment. A process 201 of delivering chunks begins at step 205 in which a plurality of chunks that are to be obtained is identified. The plurality of chunks is generally identified after a request for chunks to be buffered is obtained, for example, on an OTT client. In one embodiment, identifying the plurality of chunks may include determining that the chunks contain video content.

As will be appreciated by those skilled in the art, behavioral traffic classification techniques may be used to determine when the plurality of chunks to be obtained includes video, e.g., Internet video. Behavioral traffic classification techniques used to determine when chunks include video may include statistical techniques such as multisample entropy, multifractal analysis, and variograms. Techniques involving machine learning and deep learning may also be used to determine whether chunks include video content.

In step 207, the buffer occupancy necessary to accommodate the plurality of chunks identified in step 205 may be estimated. The buffer occupancy estimate may be obtained using deep learning and/or Bayesian inferential methods. As will be appreciated by those skilled in the art, deep learning and Bayesian inferential methods are generally able to estimate buffer occupancy by relying on the statistical properties of the flows including, but not limited to including, chunk sizes and inter-chunk arrival patterns to determine which application layer protocol generated the traffic.

It should be appreciated that the Bayesian inferential methods may rely substantially exclusively on the statistical properties of the flows.

Deadlines associated with each chunk included in the plurality of chunks are determined in step 209. A deadline associated with a chunk is generally indicative of when the chunk is needed, e.g., when the chunk is to be delivered or played out. Methods used to determine deadlines may vary widely but may include, but are not limited to including, explicitly marking the deadline for each chunk using a quality of services (QoS) mechanism and deriving the deadlines. Deadlines may generally be derived through the use of deep packet inspection (DPI) and/or behavioral traffic classification techniques. The derivation of deadlines using such techniques will be discussed in more detail below, as for example with respect to FIG. 6.

After deadlines are determined in step 209, a determination is made in step 213 as to whether any identified chunks have a relatively long deadline. It should be appreciated that the length of a deadline which is considered to be relatively long may vary widely. In one embodiment, a threshold deadline used to determine whether a particular deadline is considered to be relatively long may vary dynamically depending upon factors including, but not limited to including, the capacity of a buffer and how much space is currently available in the buffer.

If it is determined in step 213 that there are no chunks with a relatively long deadline, e.g., that there are no chunks with a deadline that exceeds a threshold deadline, then the indication is that there is no current need to deprioritize any chunks. As such, process flow moves to step 225 in which chunks are processed, e.g., obtained and/or routed, according to an order in which the chunks are requested. After the chunks are processed, the process of delivering chunks is completed.

Alternatively, if the determination in step 213 is that there is at least one chunk which has a relatively long deadline, chunks with relatively long deadlines are adaptively deprioritized in step 217. Adaptively deprioritizing chunks with relatively long deadlines may generally involve applying scheduling, routing, and/or load balancing algorithms to such that chunks with shorter deadlines may effectively be prioritized for processing. Suitable methods for adaptively deprioritizing chunks will be discussed below with reference to FIGS. 3-5.

Once chunks with relatively long deadlines are deprioritized, the chunks may be processed according to the priority of the chunks in step 221. The process of delivering chunks is completed upon processing the chunks according to priority.

Figure 3:
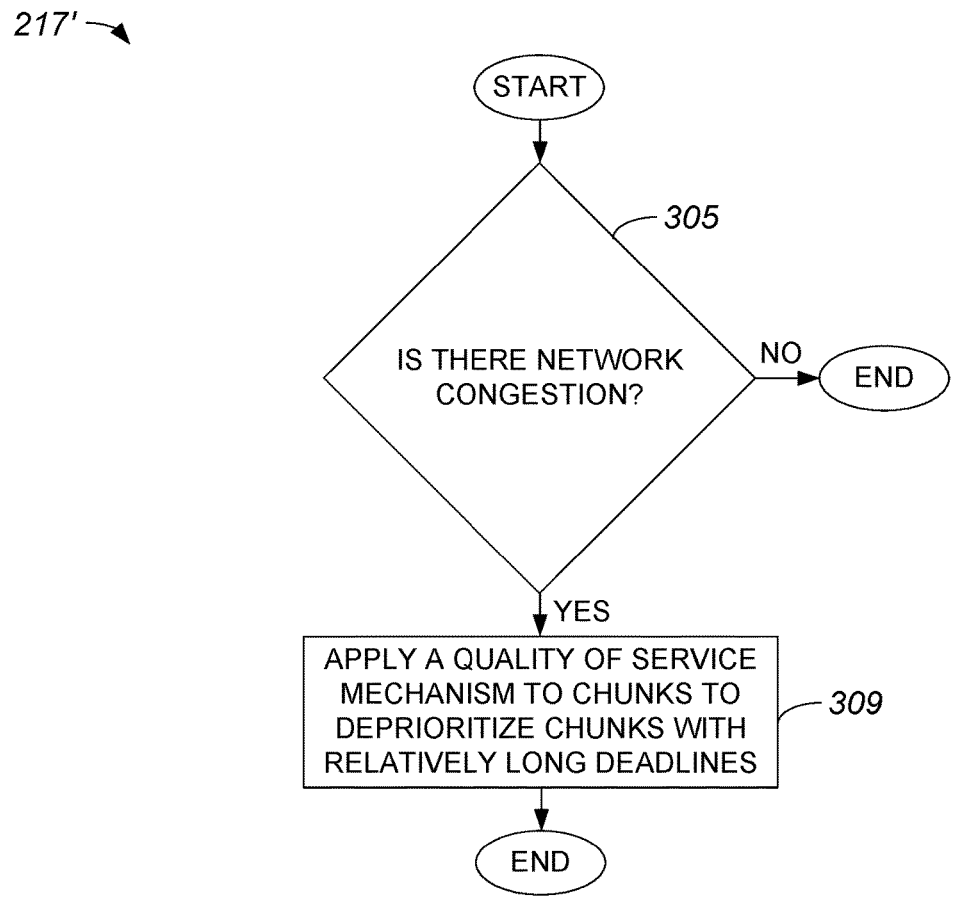
FIG. 3 is a process flow diagram which illustrates a method of adaptively deprioritizing chunks with relatively long deadlines, i.e., step 217 of FIG. 2, that includes opportunistic scheduling in accordance with an embodiment.

As mentioned above, chunks with relatively long deadlines may be adaptively deprioritized using a number of different methods. With reference to FIG. 3, a method of adaptively deprioritizing chunks with relatively long deadlines, i.e., step 217 of FIG. 2, that includes opportunistic scheduling will be described in accordance with an embodiment. A method 217' of adaptively deprioritizing chunks begins at step 305 in which it is determined whether there is network congestion. It should be appreciated that metrics used to ascertain whether a network is considered to be congested may vary widely, and may generally include determining how much bandwidth is available on the network and/or how much latency is associated with the network. If the determination in step 305 is that there is no network congestion, then the process of adaptively deprioritizing chunks is terminated.

Alternatively, if it is determined in step 305 that the network is congested, then a QoS mechanism may be applied to the chunks to deprioritize the chunks as appropriate in step 309. In other words, any suitable QoS mechanism may be used to effectively deprioritize chunks with relatively long deadlines. For example, resource reservation protocol (RSVP) may be a suitable QoS mechanism. In general, packets may be marked using any suitable mechanism to effectively deprioritize chunks. Generally, using a QoS mechanism, chunks with relatively long deadlines may be deprioritized as long as the QoS associated with video delivery is not compromised, e.g., as long as deprioritizing chunks does not result in a QoS dropping below an acceptable level. After the QoS mechanism is applied to the chunks, the process of adaptively deprioritizing chunks is completed.

Figure 4:
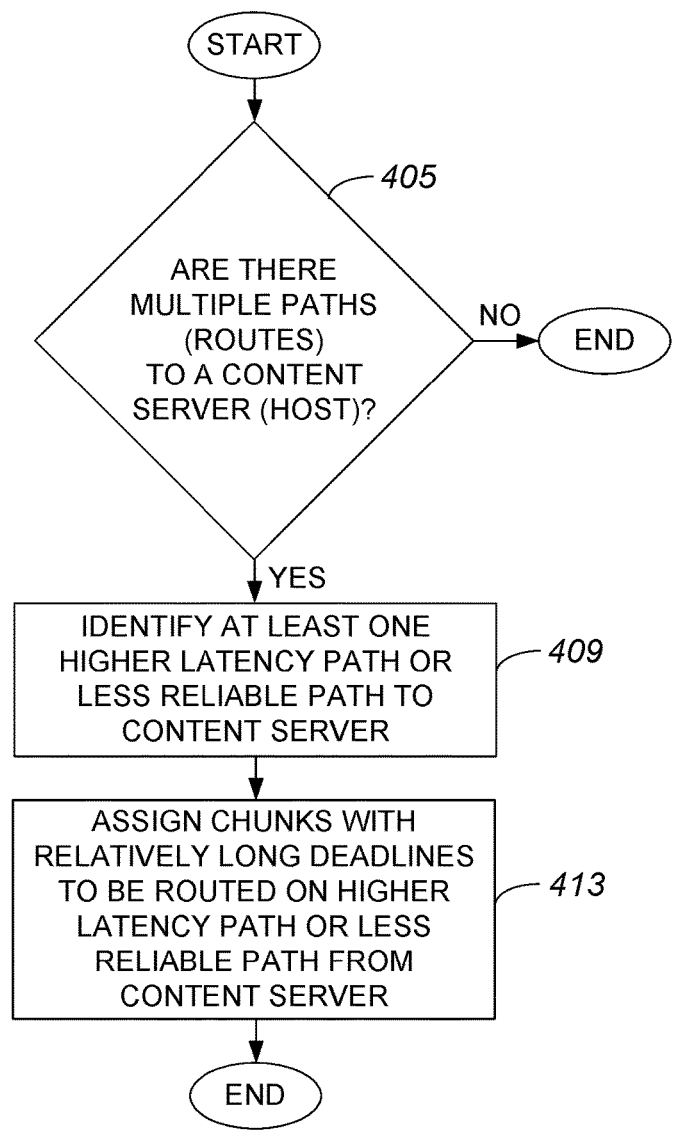
FIG. 4 is a process flow diagram which illustrates a method of adaptively deprioritizing chunks with relatively long deadlines, i.e., step 217 of FIG. 2, that includes opportunistic routing in accordance with an embodiment.

Another method which may be used to adaptively deprioritize chunks involves opportunistic routing. Opportunistic routing may be used to adaptively deprioritize chunks which have a relatively long deadline when there are multiple paths or routes over which chunks may be obtained. FIG. 4 is a process flow diagram which illustrates a method of adaptively deprioritizing chunks with relatively long deadlines, i.e., step 217 of FIG. 2, that includes opportunistic routing in accordance with an embodiment. A method 217" of adaptively deprioritizing chunks beings at step 405 in which it is determined whether multiple paths exist between a client node and a content server, e.g., a host from which chunks are to be obtained. If the determination is that multiple paths do not exist to a content server, then the method of adaptively deprioritizing chunks with relatively long deadlines is terminated.

Alternatively, if it is determined in step 405 that there are multiple paths to a content server, then process flow moves from step 405 to step 409 in which at least one higher latency path or less reliable path to a content server is identified. In general, the number of paths identified may vary widely. Once at least one higher latency path or less reliable path is identified, then chunks with relatively long deadlines may effectively be assigned to be routed on the higher latency path or less reliable path from the content server in step 413. After the chunks are assigned to be routed on the higher latency path or less reliable path, the process of deprioritizing chunks with relatively long deadlines is completed.

Figure 5:
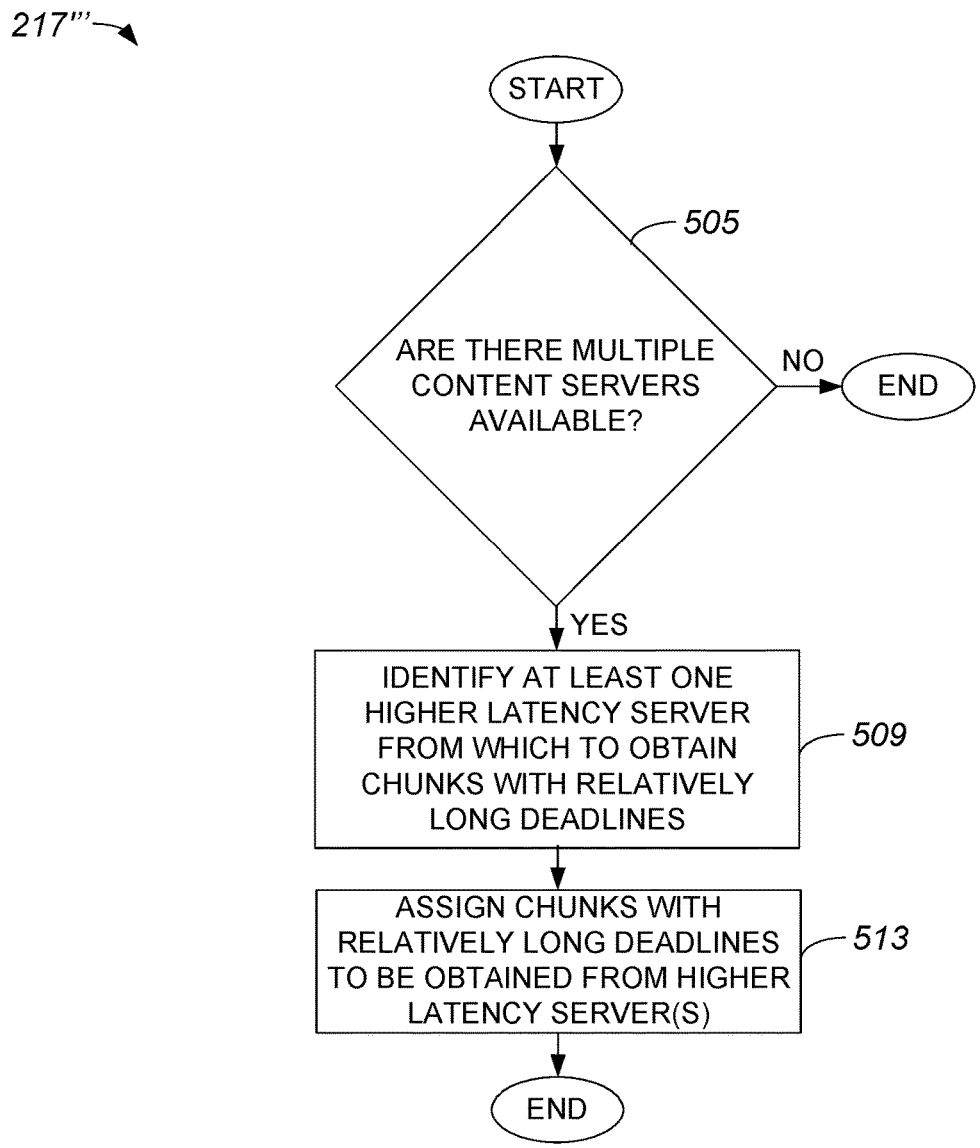
FIG. 5 is a process flow diagram which illustrates a method of adaptively deprioritizing chunks with relatively long deadlines, i.e., step 217 of FIG. 2, that includes load balancing in accordance with an embodiment.

When there is more than one content server from which particular video content may be obtained, load balancing may be applied to determine which of the content servers the particular video is to be obtained from. FIG. 5 is a process flow diagram which illustrates a method of adaptively deprioritizing chunks with relatively long deadlines, i.e., step 217 of FIG. 2, that includes load balancing in accordance with an embodiment. A method 217''' of adaptively deprioritizing chunks begins at step 505 in which a determination is made as to whether there are multiple content servers available. That is, it is determined whether there is more than one content server from which particular chunks may be obtained. If it is determined that there are not multiple content servers available from which chunks may be obtained, the process of adaptively deprioritizing chunks is terminated.

Alternatively, if it is determined in step 505 that there are multiple content servers available from which chunks may be obtained, process flow proceeds to step 509 in which at least one higher latency server is identified. As will be appreciated by those skilled in the art, higher latency servers are typically relatively far from a source of a request. Thus, the higher latency servers may generally be more remote than lower latency servers, with respect to a source of a request. The identified higher latency servers will generally be the servers from which the chunks with relatively long deadlines are to be obtained. In step 513, the chunks with relatively long deadlines are assigned such that the chunks will be obtained from the higher latency servers. Upon assigning the chunks such that the chunks will be obtained from the higher latency servers, the process of adaptively deprioritizing chunks is completed.

As previously mentioned, methods used to determine a deadline for a video chunk may vary widely. A deadline for a chunk may be determined using a method such as explicit deadline marking, in which the deadline for the chunk is marked or otherwise indicated in the chunk. In one embodiment, a deadline may be encoded substantially in an address field of a chunk. Although a deadline may be indicated as an amount of time, it should be appreciated that a deadline may instead be specified as either being relatively long or relatively short. For example, a single bit in an address field may be arranged to indicate whether a deadline is relatively long or relatively short. The deadline may be determined and marked using standard QoS methods, or any other suitable in-band or out-of-band techniques.

Figure 6:
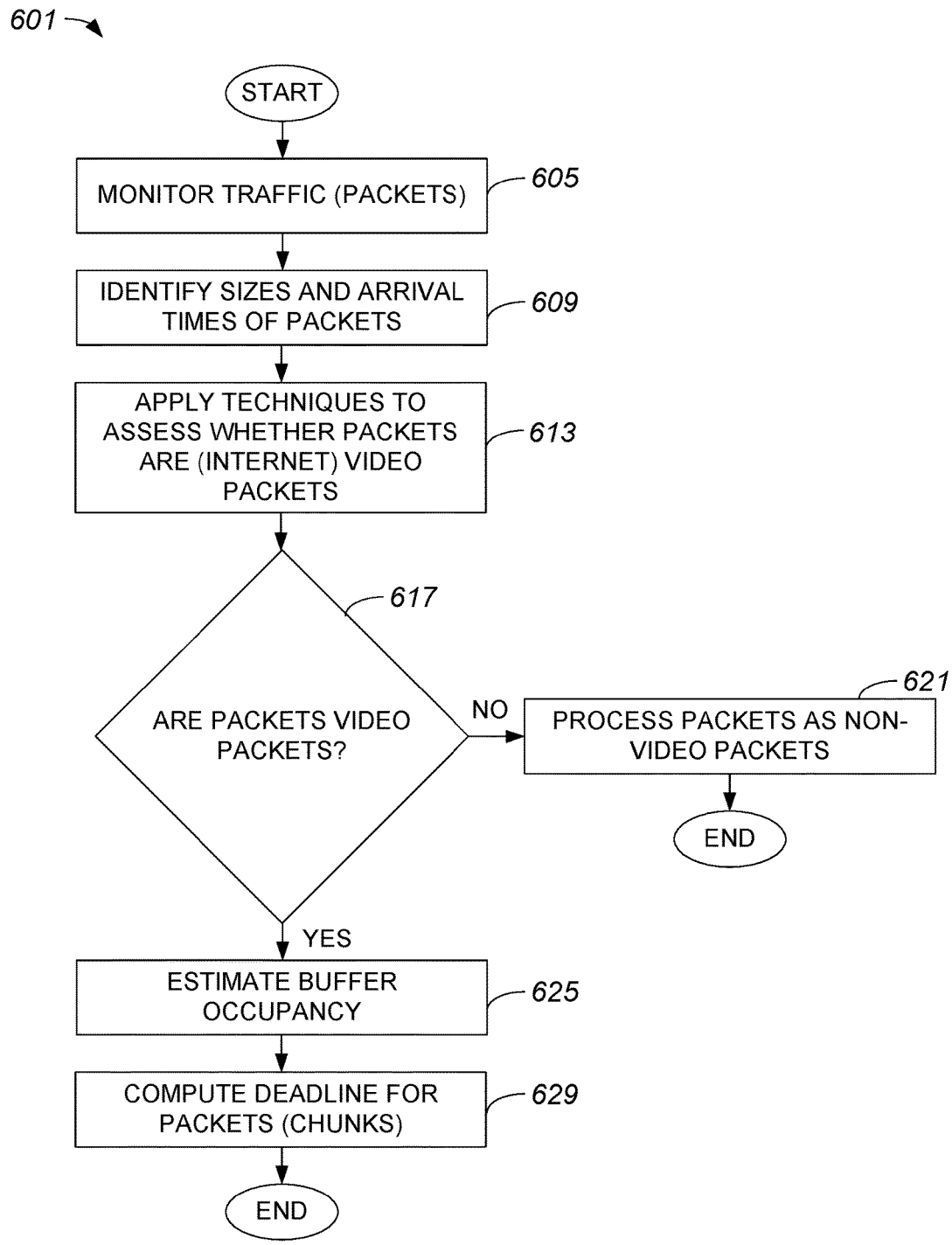
FIG. 6 is a process flow diagram which illustrates one method of determining deadlines associated with chunks included in traffic in accordance with an embodiment of the present invention.

Another method used to determine a deadline for a video chunk involves deriving a deadline by observing traffic and applying a technique such as deep packet inspection or behavioral traffic classification. With reference to FIG. 6, a method of deriving deadlines associated with chunks will be described in accordance with an embodiment of the present invention. A method 601 of determining deadlines associated with chunks that includes deriving deadlines begins at step 605 in which traffic in the form of packets and/or chunks is monitored. Substantially any suitable method may be used to monitor or otherwise observe traffic. For example, traffic may be monitored using DPI techniques and/or shallow packet inspection based on behavioral traffic classification techniques.

In step 609, the sizes and arrival times of packets and/or chunks is identified. Upon identifying the sizes and arrival times of the packets, techniques may be applied to assess whether the packets are video, e.g., internet video, packets in step 613. As will be appreciated by those skilled in the art, techniques used to assess whether packets are video packets may include, but are not limited to including, using statistical techniques, machine learning techniques, and/or deep learning techniques. Suitable statistical techniques may include multisample entropy, multifractal analysis, and variograms.

A determination is made in step 617 as to whether the packets are video packets. If it is determined in step 617 that the packets are not video packets, then the packets are processed as non-video packets, and the method of deriving deadlines associated with chunks is completed. Alternatively, if the determination in step 617 that the packets are video packets, then process flow proceeds to step 625 in which buffer occupancy is estimated. That is, it is determined how much buffer will be used by the packets. A buffer occupancy estimate may be derived using deep learning and/or Bayesian inferential techniques. It should be appreciated that such techniques may involve utilizing models which are based upon behavioral information including, but not limited to including, chunk sizes and inter-chunk arrival times.

In step 629, the buffer occupancy estimate may be used to compute a deadline estimate for a chunk that includes the packets. That is, a deadline by which the packets are needed may effectively be estimated. In one embodiment, the estimated deadline may be marked in the packets for downstream processing. It should be appreciated, however, that deadline information may instead be used locally. After the deadline for the chunk is computed, the method of determining deadlines associated with chunks is completed.

Figure 7:
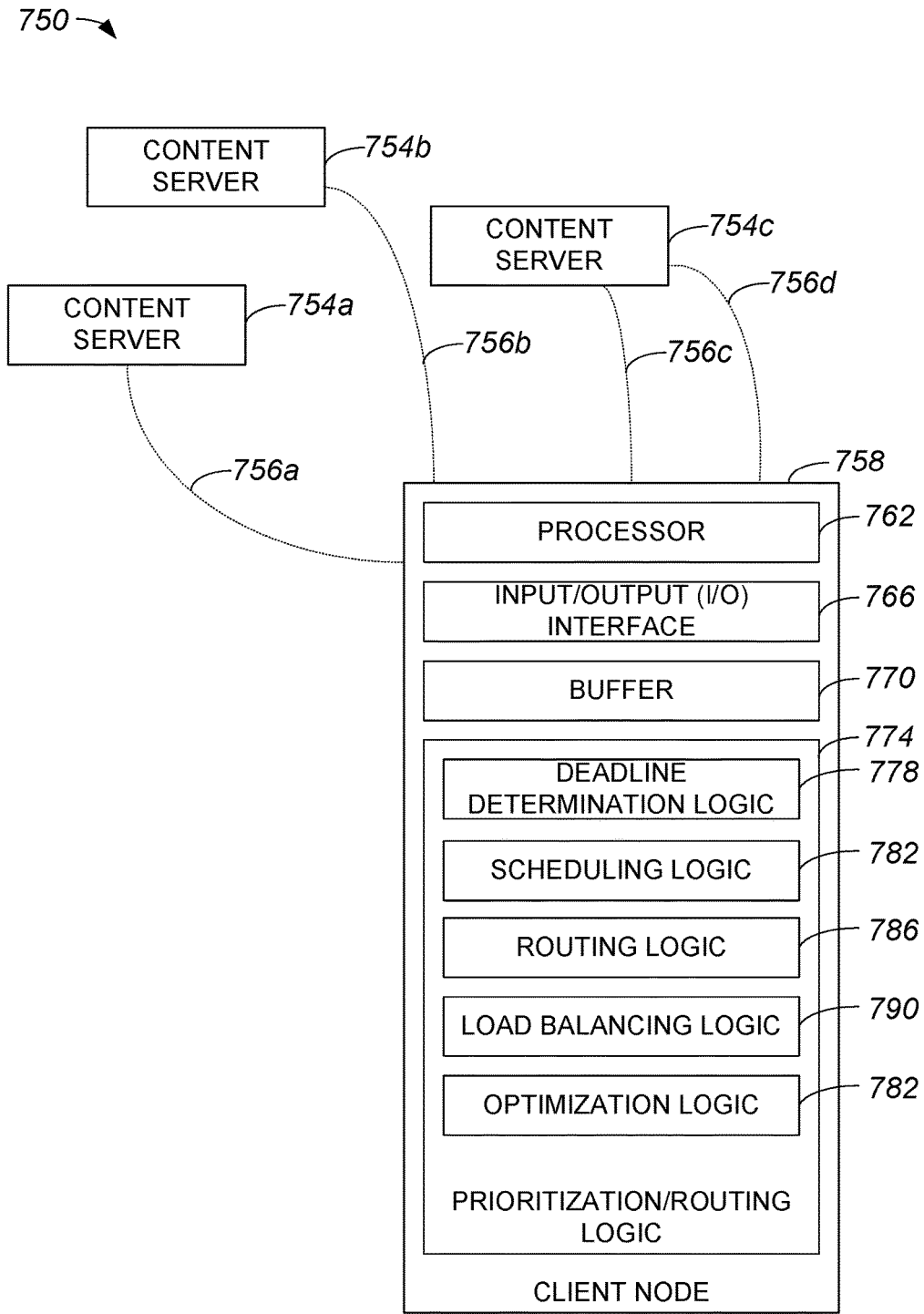
FIG. 7 is a diagrammatic block diagram representation of a video delivery network which utilizes deadline-based segmentation for video traffic in accordance with an embodiment.

FIG. 7 is a diagrammatic block diagram representation of a video delivery network which utilizes deadline-based segmentation for video traffic in accordance with an embodiment. A video delivery network 750 includes at least one client node 758 and a plurality of content servers 754*a-c*. Content servers 754*a-c* generally contain video content which is requested by client node 758. Content servers 754*a-c* generally communicate with client node 758 across communications links 756*a-d*. Each content server 754*a-c* may have any number of communications links 756*a-d* which enable content server 754*a-c* to communicate with client node 758. As shown, content server 754*a* is associated with communications link 756*a*, content server 754*b* is associated with communications link 756*b*, and content server 754*c* is associated with communications links 756*c*, 756*d*. Communications links 756*a-d* may support wireless and/or wired communications.

Client node 758 includes at least one processor 762 and an input/output (I/O) interface 766 arranged to obtain chunks and/or packets from content servers 754*a-c*. Client node 758 also includes a buffer 770 in which chunks obtained from content servers 754*a-c* are buffered, or otherwise queued for delivery and/or playout.

Prioritization/routing logic 774, which may generally include hardware and/or software logic arranged to be executed by processor 762, is configured to determine deadlines of chunks to be obtained by client node 758, to de-prioritize chunks which have relatively long deadlines, and to obtain the chunks for queueing in buffer 770. Prioritization/routing logic 774 includes deadline determination logic 778, scheduling logic 782, routing logic 786, load balancing logic 790, and optimization logic 782. It should be appreciated that prioritization/routing logic is generally also configured to identify chunks to be obtained from content servers 754*a-c*.

Deadline determination logic 778 is configured to determine deadlines associated with chunks which are to be obtained by client node 758. Scheduling logic 782 is configured to de-prioritize chunks based upon congestion in network 750 using a suitable QoS mechanism. Routing logic 786 is configured to de-prioritize chunks by identifying higher latency paths over which the chunks may be obtained, and assigning chunks with relatively long deadlines to be obtained using the higher latency paths. Load balancing logic 790 is configured to de-prioritize chunks by identifying higher latency content servers 754*a-c*, and to assign chunks with relatively long deadlines to be obtained from higher latency content servers 754*a-c*. Optimization logic 782 is generally configured to use knowledge of chunk deadlines to substantially optimize performance associated with video delivery.

Although only a few embodiments have been described in this disclosure, it should be understood that the disclosure may be embodied in many other specific forms without departing from the spirit or the scope of the present disclosure. By way of example, a threshold deadline used to determine whether a delivery deadline is relatively long or relatively short may vary widely depending upon a variety of different factors including, but not limited to including, how much space is available in a buffer. In addition, a threshold deadline may vary dynamically. That is, a threshold deadline may effectively be adaptive, and may change during the course of obtaining chunks associated with a particular video. While the use deadline-based segmentation has been described in terms of video traffic, it should be understood that the use of deadlines to prioritize traffic is not limited to use with respect to video traffic. For example, deadline-based segmentation that effectively allows for special handling of traffic with relatively long delivery deadlines may be applied traffic associated with radio networks and/or any suitable wireless network.

As described above, chunks with relatively long deadlines may be deprioritized using a number of different methods. It should be appreciated that a combination of the different methods may be used to deprioritize chunks with relatively long deadlines. By way of example, chunks with relatively long deadlines may be deprioritized using a combination of opportunistic routing and load balancing without departing from the spirit or the scope of the disclosure.

By determining deadlines associated with chunks, radio access network (RAN) efficiency and/or handover efficiency in video delivery may be improved. For example, as will be understood by those skilled in the art, inter-channel multiplexing generally incurs an overhead cost. If a deadline for data delivery is identified as being relatively long, a particular channel may be substantially skipped in a multiplexing scheme.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. By way of example, in addition to potentially including a deadline estimate in a packet to facilitate downstream processing, an index of confidence in the deadline estimate may be calculated and either utilized locally or included in the packet. Therefore, the present examples are to be considered as illustrative and not restrictive, and the examples is not to be limited to the details given herein, but may be modified within the scope of the appended claims.

What is claimed is:
1. A method comprising:
   identifying at least a first chunk to be obtained, the at least first chunk including at least a first packet;
   determining a deadline for the first chunk, the deadline being indicative of an amount of time before the first chunk is needed;

determining whether the deadline for the first chunk is longer than a threshold deadline, wherein when the deadline for the first chunk is longer than the threshold deadline, the deadline for the first chunk is determined to be long;

de-prioritizing the first chunk with respect to obtaining the first chunk for queueing in a buffer when it is determined that the deadline for the first chunk is long, wherein the buffer is associated with a client node in a network and a plurality of paths to the buffer is included in the network, and wherein de-prioritizing the first chunk with respect to obtaining the first chunk for queueing in the buffer includes identifying a high latency path of the plurality of paths; and obtaining the first chunk for queueing in the buffer, wherein obtaining the first chunk for queueing in the buffer includes obtaining the first chunk after obtaining a second chunk for queueing in the buffer, the second chunk having a shorter deadline than the deadline for the first chunk, and wherein obtaining the first chunk for queueing in the buffer includes obtaining the first chunk from the high latency path, the high latency path being a path arranged to support chunks with deadlines longer than the threshold deadline.

2. A method comprising:

identifying at least a first chunk to be obtained, the at least first chunk including at least a first packet;

determining a deadline for the first chunk, the deadline being indicative of an amount of time before the first chunk is needed;

determining whether the deadline for the first chunk is longer than a threshold deadline, wherein when the deadline for the first chunk is longer than the threshold deadline, the deadline for the first chunk is determined to be long;

de-prioritizing the first chunk with respect to obtaining the first chunk for queueing in a buffer when it is determined that the deadline for the first chunk is long, wherein the buffer is associated with a client node in a network and a plurality of paths to the buffer is included in the network, and wherein de-prioritizing the first chunk with respect to obtaining the first chunk for queueing in the buffer includes identifying an unreliable path of the plurality of paths; and obtaining the first chunk for queueing in the buffer, wherein obtaining the first chunk for queueing in the buffer includes obtaining the first chunk after obtaining a second chunk for queueing in the buffer, the second chunk having a shorter deadline than the deadline for the first chunk, and wherein obtaining the first chunk for queueing in the buffer includes obtaining the first chunk from the unreliable path.

3. Logic encoded in one or more tangible non-transitory, computer-readable media for execution and when executed operable to:

identify at least a first chunk to be obtained, the at least first chunk including at least a first packet;

determine a deadline for the first chunk, the deadline being indicative of an amount of time before the first chunk is needed;

determine whether the deadline for the first chunk is longer than a threshold deadline, wherein when the deadline for the first chunk is longer than the threshold deadline, the deadline for the first chunk is determined to be long;

de-prioritize the first chunk with respect to obtaining the first chunk for queueing in a buffer when it is determined that the deadline for the first chunk is long wherein the buffer is associated with a client node in a network and a plurality of paths to the buffer is included in the network, and wherein the logic operable to de-prioritize the first chunk with respect to obtaining the first chunk for queueing in the buffer is operable to identify a high latency path of the plurality of paths; and obtain the first chunk for queueing in the buffer, wherein the logic operable to obtain the first chunk for queueing in the buffer is operable to obtain the first chunk after obtaining a second chunk for queueing in the buffer, the second chunk having a shorter deadline than the deadline for the first chunk, and wherein the logic operable to obtain the first chunk for queueing in the buffer is operable to obtain the first chunk from the high latency path, the high latency path being a path arranged to support chunks with deadlines longer than the threshold deadline.

4. Logic encoded in one or more tangible non-transitory, computer-readable media for execution and when executed operable to:

identify at least a first chunk to be obtained, the at least first chunk including at least a first packet;

determine a deadline for the first chunk, the deadline being indicative of an amount of time before the first chunk is needed;

determine whether the deadline for the first chunk is longer than a threshold deadline, wherein when the deadline for the first chunk is longer than the threshold deadline, the deadline for the first chunk is determined to be long;

de-prioritize the first chunk with respect to obtaining the first chunk for queueing in a buffer when it is determined that the deadline for the first chunk is long, wherein the buffer is associated with a client node in a network and a plurality of paths to the buffer is included in the network, and wherein the logic operable to de-prioritize the first chunk with respect to obtaining the first chunk for queueing in the buffer is operable to identify an unreliable path of the plurality of paths; and obtain the first chunk for queueing in the buffer, wherein the logic operable to obtain the first chunk for queueing in the buffer is operable to obtain the first chunk after obtaining a second chunk for queueing in the buffer, the second chunk having a shorter deadline than the deadline for the first chunk, and wherein the logic operable to obtain the first chunk for queueing in the buffer is operable to obtain the first chunk from the unreliable path.

5. An apparatus comprising:

a processor;

an input/output (I/O) interface;

a buffer; and a logic arrangement, the logic arrangement including program code configured to be executed by the processor, the logic arrangement including logic configured to identify at least a first chunk to be obtained from at least one content server through the I/O interface, the first chunk including at least a first packet, the logic arrangement further including prioritization logic, the prioritization logic being configured to determine a delivery deadline for the first chunk, to determine whether the delivery deadline for the first chunk is long, to de-prioritize the first chunk with respect to obtaining the first chunk for queueing in the buffer when it is determined that the delivery deadline for the first chunk is longer than a threshold deadline, wherein when the delivery deadline for the first chunk is longer than the threshold deadline, the delivery deadline for the first chunk is determined to be long, and to obtain the first chunk for queueing in the buffer after obtaining a second chunk for queueing in the buffer, the second chunk having a shorter delivery deadline than the delivery deadline for the first chunk, wherein the apparatus is a client node in a network and a plurality of paths to the buffer is included in the network, and wherein the prioritization logic operable to de-prioritize the first chunk with respect to obtaining the first chunk for queueing in the buffer is operable to identify an unreliable path of the plurality of paths and the logic operable to obtain the first chunk for queueing in the buffer is operable to obtain the first chunk from the unreliable path.

* * * * *